United States Patent
Doyon (10) Patent No.: US 12,492,763 B2
(45) Date of Patent: Dec. 9, 2025

(54) ADAPTIVE CLAMPING APPARATUS

(71) Applicant: Pratt & Whitney Canada Corp., Longueuil (CA)

(72) Inventor: Francois Doyon, Ste-Julie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 97 days.

(21) Appl. No.: 18/431,506

(22) Filed: Feb. 2, 2024

(65) Prior Publication Data
US 2025/0251063 A1 Aug. 7, 2025

(51) Int. Cl.
*F16L 23/028* (2006.01)
*F01D 25/24* (2006.01)

(52) U.S. Cl.
CPC ........ *F16L 23/0286* (2013.01); *F01D 25/243* (2013.01)

(58) Field of Classification Search
CPC ... F01D 25/243; F16L 23/006; F16L 23/0283; F16L 23/0286; F16L 23/16–24
See application file for complete search history.

(56) References Cited

U.S. PATENT DOCUMENTS

| | | | |
|---|---|---|---|
| 5,497,616 A | 3/1996 | Roberts | |
| 6,099,198 A | 8/2000 | Kotzur et al. | |
| 6,216,438 B1 | 4/2001 | Aschenbruck et al. | |
| 6,782,702 B2* | 8/2004 | Charon | F04D 29/522 60/785 |
| 8,079,773 B2 | 12/2011 | Blanton | |
| 9,982,821 B1 | 5/2018 | Scheiferstein et al. | |
| 10,393,160 B2 | 8/2019 | Klingels et al. | |
| 11,346,250 B2* | 5/2022 | Pommier | F01D 17/145 |
| 2008/0159860 A1 | 7/2008 | Cortequisse et al. | |
| 2015/0143813 A1 | 5/2015 | Salunkhe et al. | |
| 2016/0040810 A1 | 2/2016 | Winkler | |
| 2018/0209284 A1 | 7/2018 | Day et al. | |

(Continued)

FOREIGN PATENT DOCUMENTS

| | | |
|---|---|---|
| DE | 1217711 | 5/1966 |
| DE | 4405995 | 12/2007 |

(Continued)

OTHER PUBLICATIONS

European Patent Office, European Partial Search Report dated Apr. 3, 2025 in Application No. 24203675.4.

(Continued)

*Primary Examiner* — Christopher R Legendre
(74) *Attorney, Agent, or Firm* — SNELL & WILMER L.L.P.

(57) ABSTRACT

An air duct interface includes a first air duct including a first opening and a first coupling flange disposed circumferentially around the first opening, a second air duct including a second opening and a second coupling flange circumferentially surrounding the second opening, a first clamping block coupled to the first coupling flange by a first bolt, wherein the second coupling flange is disposed between a portion of the first clamping block and the first coupling flange, and a first adjusting block coupled to the first coupling flange by a second bolt, the first adjusting block engaging the first coupling flange and the second coupling flange.

20 Claims, 9 Drawing Sheets

(56) References Cited

U.S. PATENT DOCUMENTS

| | | | |
|---|---|---|---|
| 2018/0283212 A1 | 10/2018 | Wiebe | |
| 2019/0292946 A1* | 9/2019 | Karram | |
| 2025/0123021 A1* | 4/2025 | Gover | F01D 25/30 |
| 2025/0251063 A1* | 8/2025 | Doyon | F16L 23/0286 |

FOREIGN PATENT DOCUMENTS

| | | |
|---|---|---|
| DE | 202015006063 | 9/2015 |
| EP | 2048423 | 4/2009 |
| EP | 3241754 | 2/2020 |
| JP | S56134486 | 10/1981 |
| JP | H0629549 | 4/1994 |

OTHER PUBLICATIONS

European Patent Office, European Search Report dated Jul. 2, 2025 in Application No. 25155620.5.
European Patent Office, European Search Report dated Jul. 4, 2025 in Application No. 24203675.4.

* cited by examiner

ADAPTIVE CLAMPING APPARATUS

FIELD

The present disclosure generally relates to aircraft engines, and more particularly, to connection mechanisms for high temperature air ducting for aircraft engines.

BACKGROUND

Aircraft engines use ducting to transfer gasses from one part of the aircraft engine to another. For example, a duct is used to pass high temperature gases from a combustion engine through to the turbine section of the aircraft engine. Aircraft engines are generally installed in nacelles that are mounted on the aircraft. However, some combinations of aircraft engines and nacelles have space and access limitations that make it difficult to use conventional bolted joint configurations to attach the ducting to the aircraft engine. Additionally, conventional solutions locate bolted joints in the path of the high temperature which subjects the bolts to high temperatures, potentially reducing the lifespan of the bolted joint and potentially introducing performance losses.

SUMMARY

Disclosed herein is an air duct interface. The air duct interface includes a first air duct including a first opening and a first coupling flange disposed circumferentially around the first opening, a second air duct including a second opening and a second coupling flange circumferentially surrounding the second opening, a first clamping block coupled to the first coupling flange by a first bolt, wherein the second coupling flange is disposed between a portion of the first clamping block and the first coupling flange, and a first adjusting block coupled to the first coupling flange by a second bolt, the first adjusting block engaging the first coupling flange and the second coupling flange.

In various embodiments, the first coupling flange includes a sealing face disposed circumferentially around the first opening and an extension disposed circumferentially around the sealing face. In various embodiments, the extension includes a first hole configured to receive the first bolt and a second hole configured to receive the second bolt. In various embodiments, the extension includes a first portion extending in a first direction, a second portion extending in a second direction orthogonal to the first direction, a third portion extending in a third direction opposite the first direction, and a fourth portion extending in a fourth direction opposite the second direction, the first clamping block is coupled to the first portion, and the first adjusting block is coupled to the fourth portion.

In various embodiments, the third portion includes a first angled face and the fourth portion includes a second angled face, wherein the second angled engages the first adjusting block. In various embodiments, the second coupling flange includes a sealing surface and a plurality of angled clamping surfaces. In various embodiments, the plurality of angled clamping surfaces includes a first clamping surface extending in a first direction, a second clamping surface extending in a second direction orthogonal to the first direction, a third clamping surface extending in a third direction opposite the first direction, and a fourth clamping surface extending in a fourth direction opposite the second direction.

In various embodiments, the first clamping block includes a top surface, a bottom surface, and an angled surface, wherein the bottom surface engages the first coupling flange and the angled surface engages the second coupling flange. In various embodiments, the first adjusting block includes a top surface, a bottom surface, a first angled portion, a second angled portion opposite the first angled portion, and an opening configured to receive the second bolt, wherein the bottom surface engages the first coupling, the first angled portion engages the first coupling flange, and the second angled portion engages the second coupling flange. In various embodiments, the opening is oblong.

Also disclosed herein is a system for connecting an air duct to an aircraft engine. The system includes a mating interface that includes a first air duct including a first opening and a first coupling flange disposed circumferentially around the first opening, and a second air duct including a second opening and a second coupling flange circumferentially surrounding the second opening, a first clamping block coupled to the first coupling flange by a first bolt, wherein the second coupling flange is disposed between a portion of the first clamping block and the first coupling flange, and a first adjusting block coupled to the first coupling flange by a second bolt, the first adjusting block engaging the first coupling flange and the second coupling flange.

In various embodiments, the first coupling flange includes a sealing face disposed circumferentially around the first opening and an extension disposed circumferentially around the sealing face. In various embodiments, the extension includes a first hole configured to receive the first bolt and a second hole configured to receive the second bolt. In various embodiments, the extension includes a first portion extending in a first direction, a second portion extending in a second direction orthogonal to the first direction, a third portion extending in a third direction opposite the first direction, and a fourth portion extending in a fourth direction opposite the second direction, the first clamping block is coupled to the first portion, and the first adjusting block is coupled to the fourth portion.

In various embodiments, the third portion includes a first angled face and the fourth portion includes a second angled face, wherein the second angled engages the first adjusting block. In various embodiments, the second coupling flange includes a sealing surface and a plurality of angled clamping surfaces. In various embodiments, the plurality of angled clamping surfaces includes a first clamping surface extending in a first direction, a second clamping surface extending in a second direction orthogonal to the first direction, a third clamping surface extending in a third direction opposite the first direction, and a fourth clamping surface extending in a fourth direction opposite the second direction.

In various embodiments, the first clamping block includes a top surface, a bottom surface, and an angled surface, wherein the bottom surface engages the first coupling flange and the angled surface engages the second coupling flange. In various embodiments, the first adjusting block includes a top surface, a bottom surface, a first angled portion, a second angled portion opposite the first angled portion, and an opening configured to receive the second bolt, wherein the bottom surface engages the first coupling, the first angled portion engages the first coupling flange, and the second angled portion engages the second coupling flange. In various embodiments, the opening is oblong.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is an air ducting interface configured to couple a first air duct to a second air duct. Specifically, a ducting interface is provided for use where access is limited. In various embodiments, the first duct is an exhaust duct and the second air duct is a turbine section inlet of an aircraft engine. In various embodiments, the air ducting interface includes four clamping blocks. In various embodiments, the first air duct includes a first coupling flange and the second air duct includes a second coupling flange. In various embodiments, the first coupling flange includes a sealing face and four appendices to receive the four clamping blocks. In various embodiments, two adjacent appendices may be flat. In various embodiments, the flat appendices may provide a secure surface for pre-mounting two clamping blocks. In various embodiments, one or more bolts may be used to secure each clamping block to each of the appendices. In various embodiments, the other two appendices may be located opposite the two adjacent appendices. In various embodiments, each of the other two appendices may include a flat surface and a tapered shroud. In various embodiments, the second air duct may include a flat sealing surface and four angled clamping surfaces.

In various embodiments, each clamping block includes a flat surface and an angled surface. In various embodiments, the angled surface may be configured to mate with a flange of the second air duct. In various embodiments, the flange of the second air duct may slide between the flange of the first air duct and the tapered surfaces of two of the clamping blocks. In various embodiments, two adjusting blocks may be installed on the other two appendices after the second air duct is mated with the first air duct. In various embodiments, the two adjusting blocks each include a bolting face and two angled faces. In various embodiments, one of the angled faces is configured to mate with the tapered shroud of the one of the appendices and the other angled face is configured to mate with the angled face of the second air duct. In various embodiments, each of the adjusting blocks includes one or more holes configured to receive one or more bolts. In various embodiments, the one or more holes may be oblong to allow for the adjusting block to displace, translate, or move during assembly.

The angled interface between the first air duct flange and the adjusting blocks tends to apply a compound force on the first and second air duct that tends to provide an improved coupling between the first and second air duct. The compound force, in various embodiments, tends to minimize the moment forces applied on the bolts during installation.

Figure 1A:
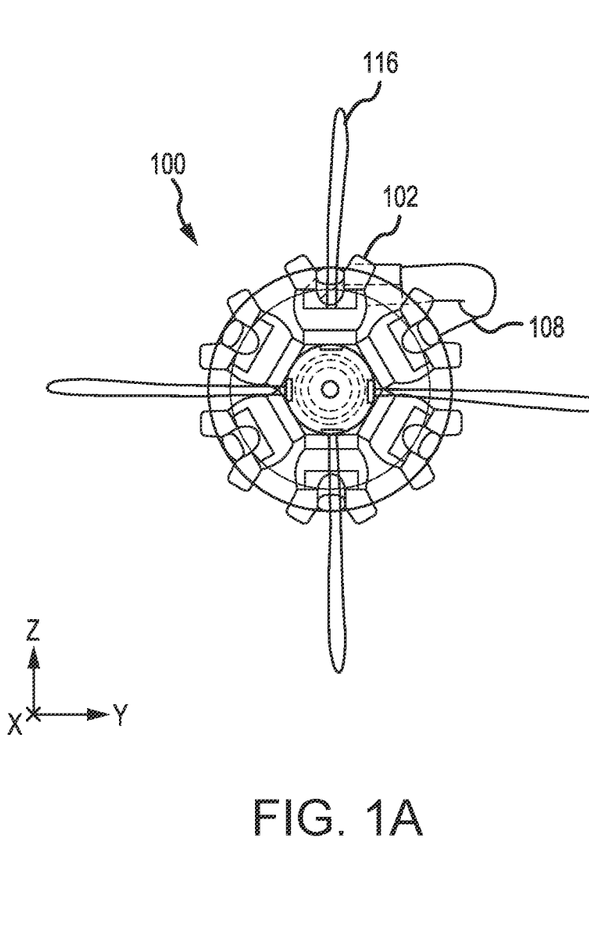
FIGS. 1A and 1B illustrate a front view and a side view of an aircraft engine, in accordance with various embodiments.
Figure 1B:
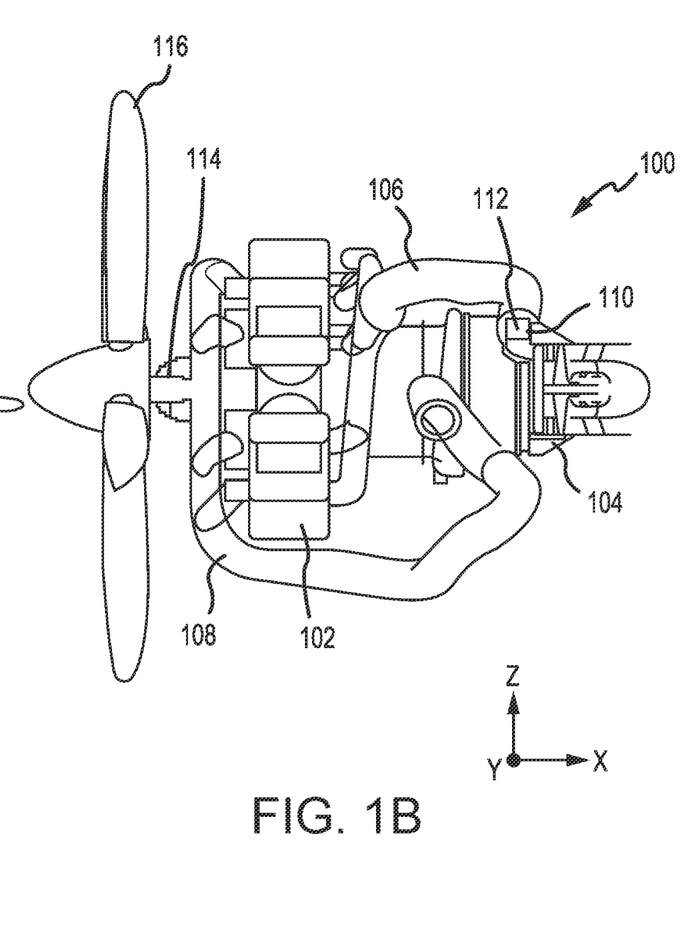

Referring now to FIGS. 1A and 1B, an aircraft engine 100 is illustrated, in accordance with various embodiments. FIG. 1A illustrates a front view of aircraft engine 100 and FIG. 1B illustrates a side view of aircraft engine 100. Aircraft engine 100 includes a combustion engine 102, a turbine hot section 104, a combustion engine exhaust pipe 106, a compressor booster pipe 108, a turbine section inlet 110, an air ducting interface 112, a drive shaft 114, and a propeller assembly 116. Combustion engine 102 receives fuel (e.g., jet fuel) and combusts the fuel in order to provide power to drive shaft 114, causing drive shaft 114 to rotate. Propeller assembly 116 is coupled to drive shaft 114 and rotates in response to the rotation of drive shaft 114. Fuel combustion within combustion engine 102 further heat and high temperature gases.

Compressor booster pipe 108 is coupled to combustion engine 102 at a first end and to a compress of aircraft engine 100 at a second end. Exhaust pipe 106 is couple to combustion engine 102 at a first end and to turbine hot section 104 at a second end. Specifically, exhaust pipe 106 is coupled to turbine section inlet 110 of turbine hot section 104. The heated gases exit combustion engine 102, flow through exhaust pipe 106, and into turbine hot section 104 through turbine section inlet 110. Air ducting interface 112 is the interface between exhaust pipe 106 and turbine hot section 104.

During installation, aircraft engine 100 is installed on an aircraft, and more specifically, within a nacelle installed on the aircraft without exhaust pipe 106 and compressor booster pipe 108. After installing aircraft engine 100 in the nacelle, exhaust pipe 106 and compressor booster pipe 108 are installed on, or coupled to, aircraft engine 100. Specifically, the first end of exhaust pipe 106 is coupled to combustion engine 102 and the second end of exhaust pipe 106 is coupled to turbine section inlet 110 of turbine hot section 104. In various embodiments, air ducting interface 112 may be used to facilitate installation of exhaust pipe 106 when conventional interface systems cannot be used to due the limited space available within the nacelle after installation of aircraft engine 100.

Figure 2A:
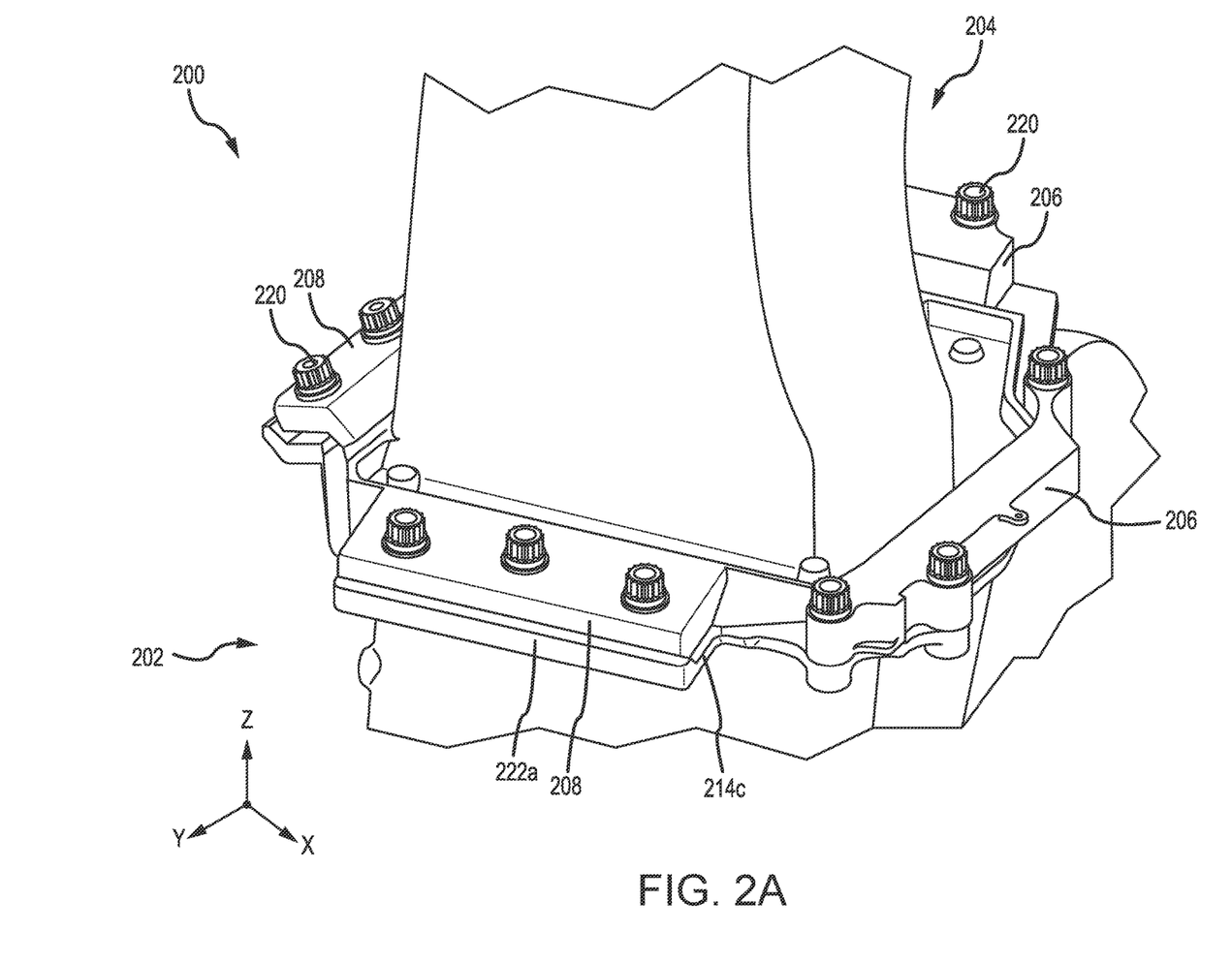
FIGS. 2A, 2B, 2C, 2D, 2E, 2F, 2G, 2H, 2I, 2J, 2K, and 2L illustrate views of an air ducting interface for use with an aircraft engine including a system of clamps to connect an air duct to the aircraft engine, in accordance with various embodiments.
Figure 2B:
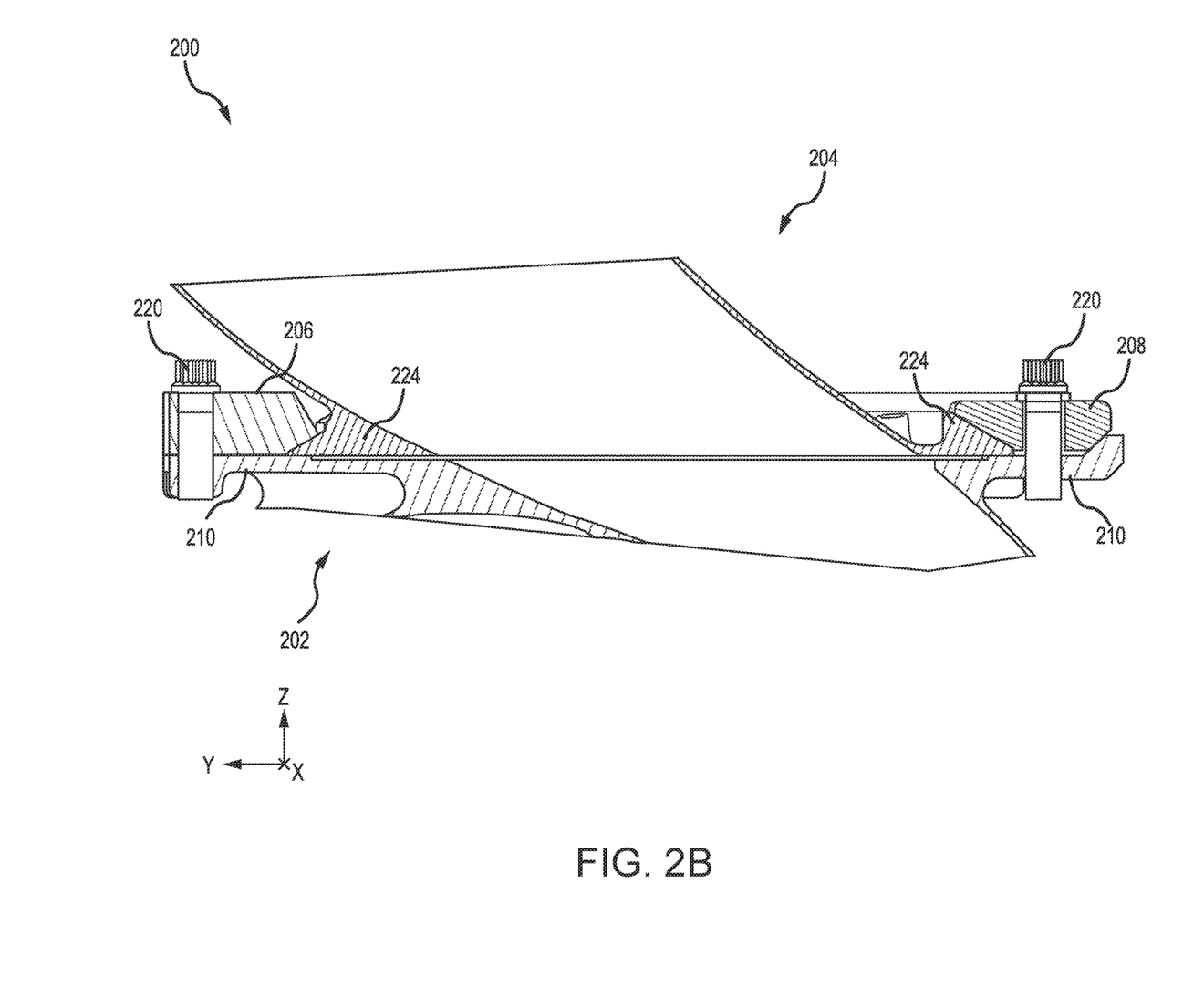
Figure 2C:
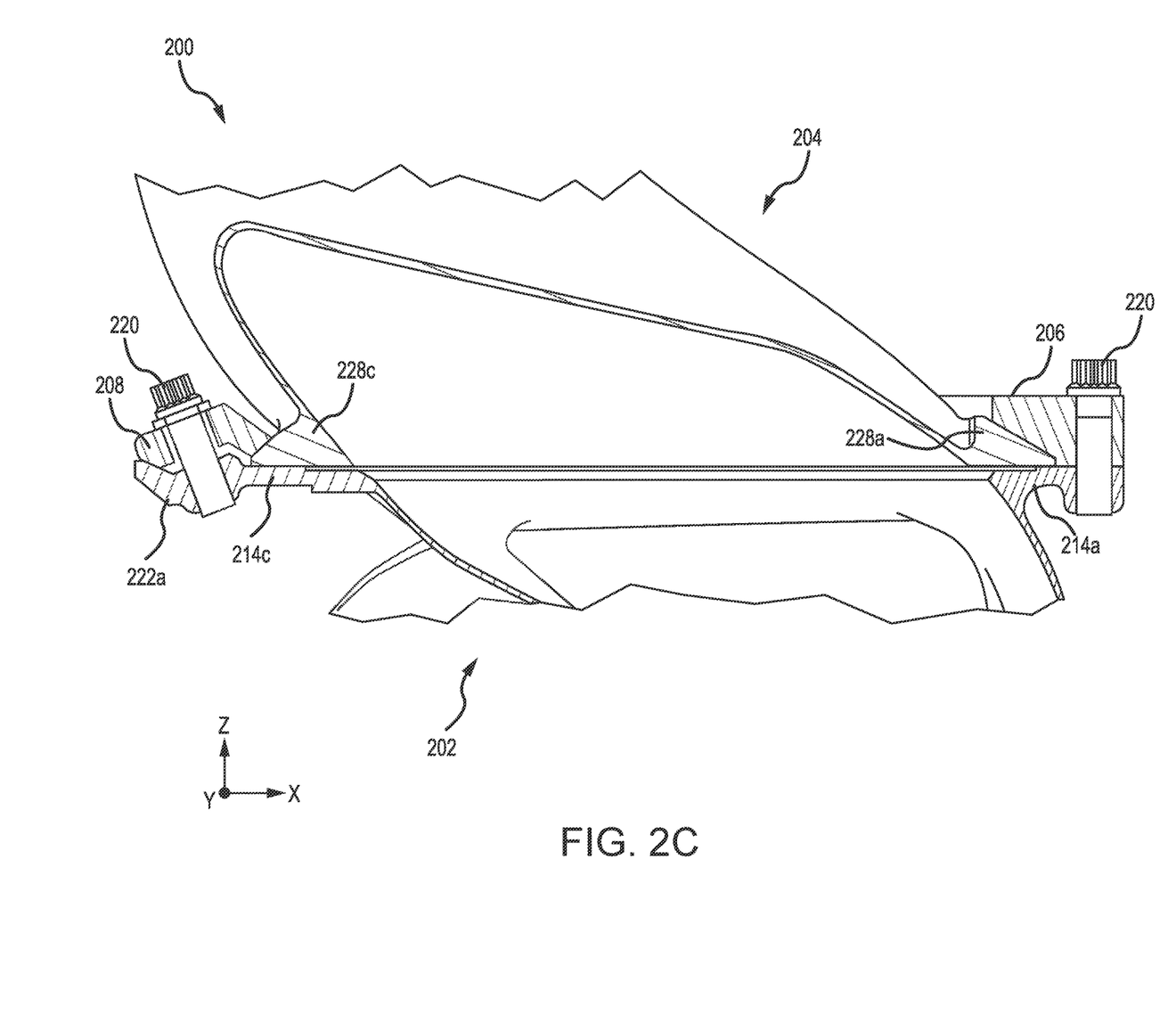
Figure 2D:
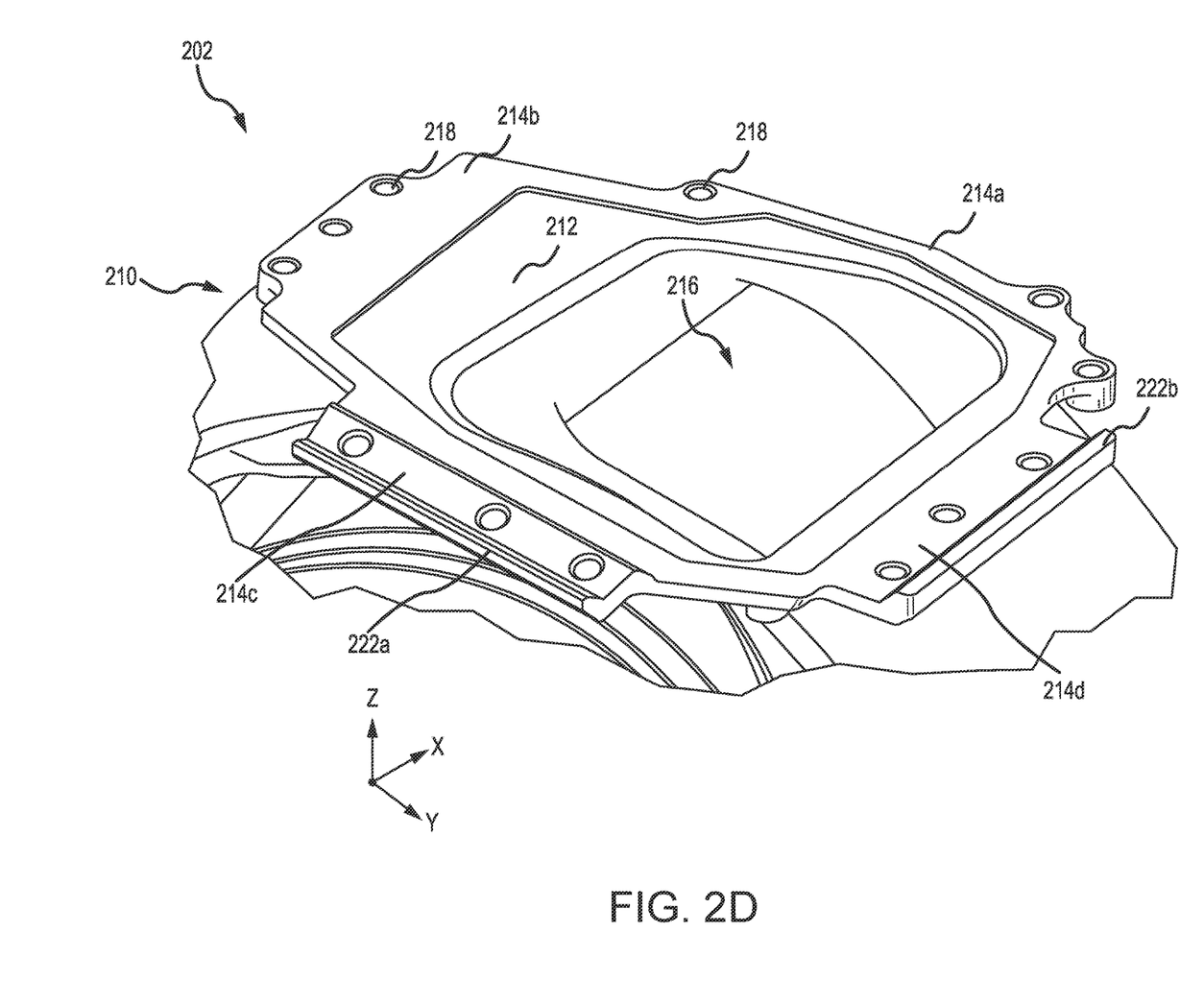
Figure 2E:
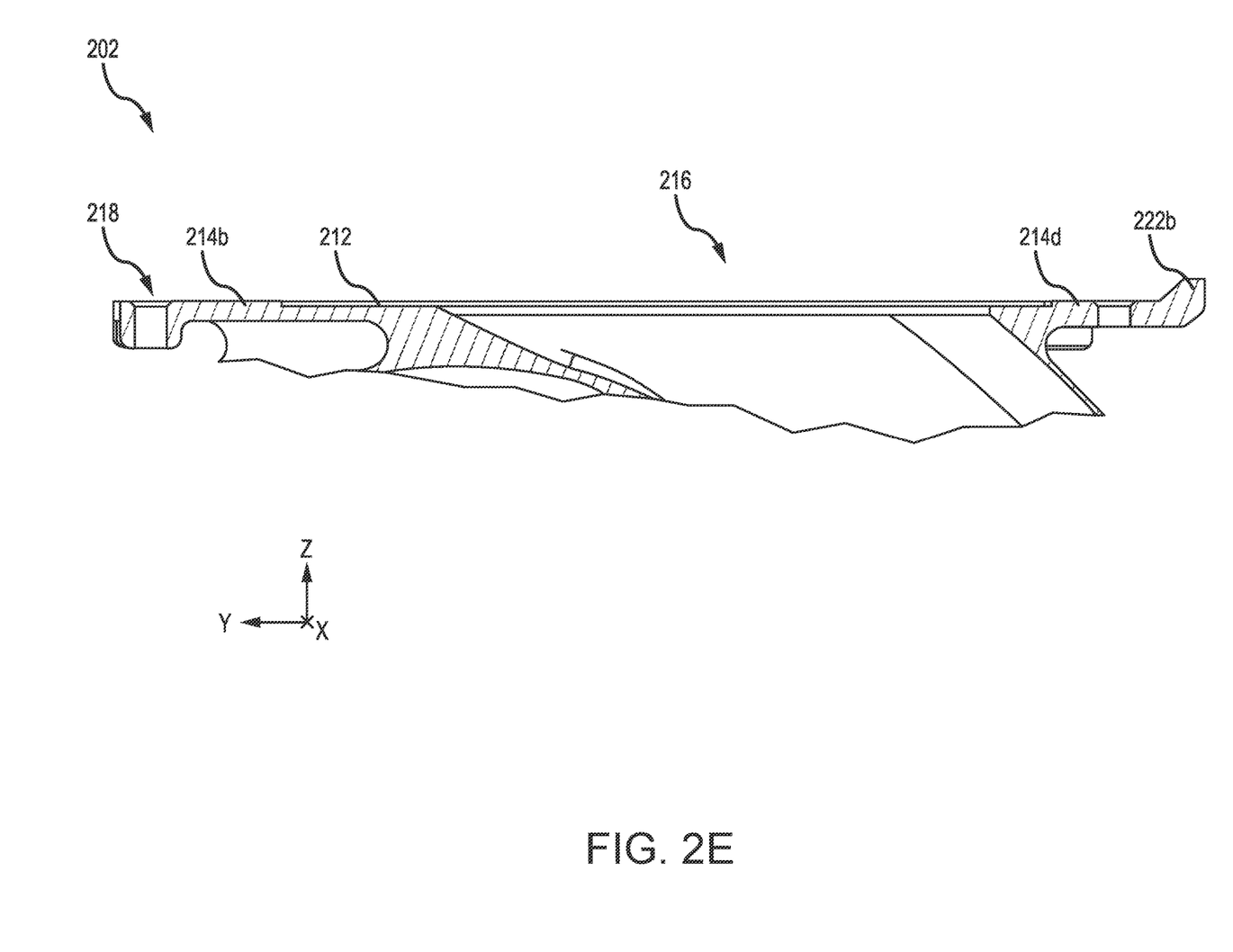
Figure 2F:
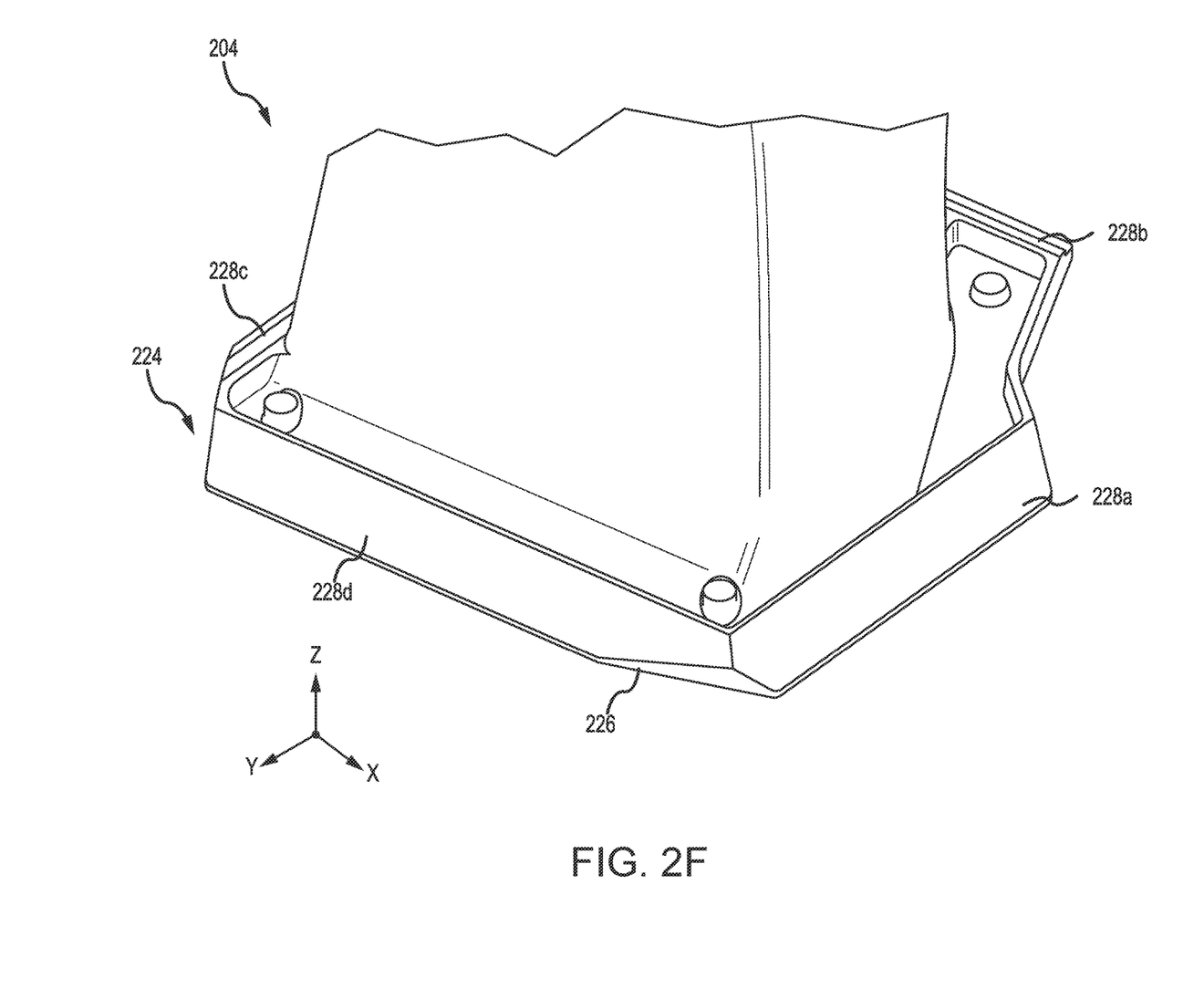
Figure 2G:
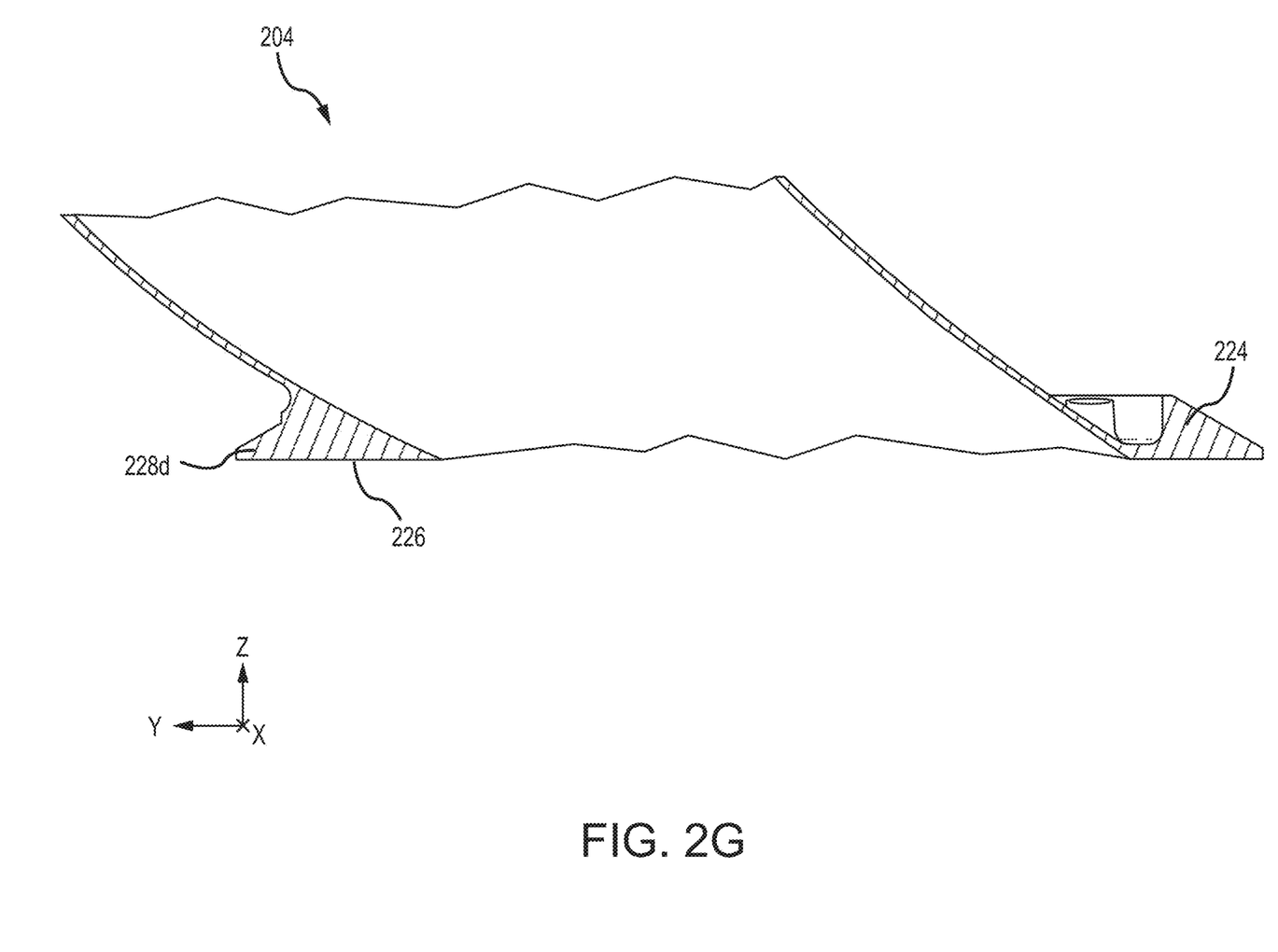
Figure 2H:
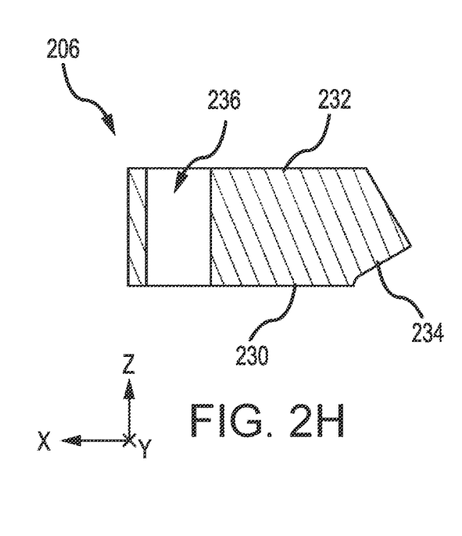
Figure 2I:
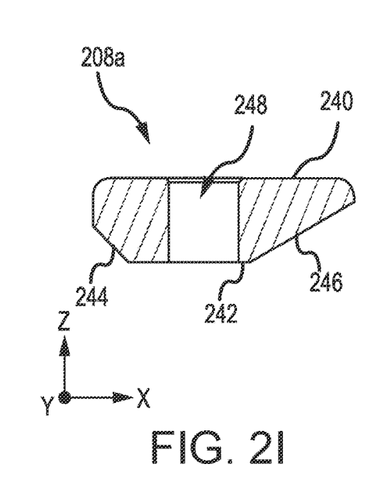
Figure 2J:
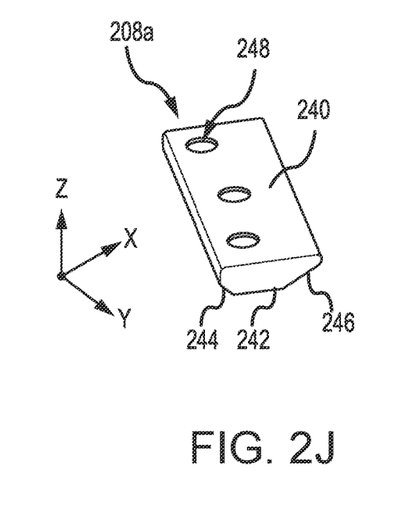
Figure 2K:
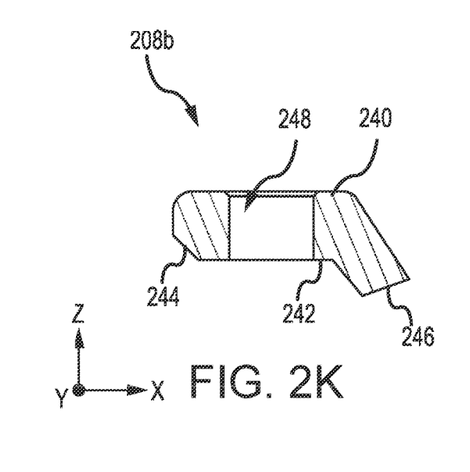
Figure 2L:
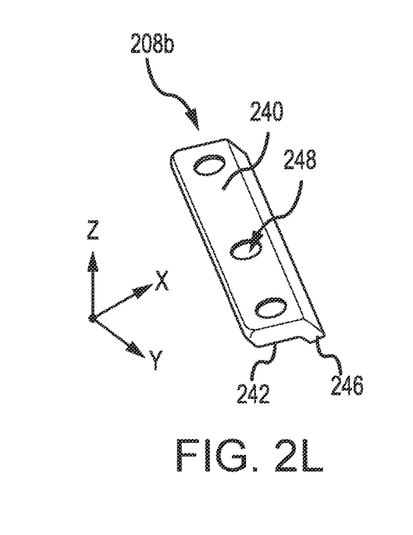

Referring now to FIGS. 2A-2L, different views of an air ducting interface 200 are illustrated, in accordance with various embodiments. In various embodiments, air ducting interface 200 may be an example of air ducting interface 112 described above in FIGS. 1A and 1B. Air ducting interface 200 includes a first air duct 202, a second air duct 204, a plurality of clamping blocks 206, and a plurality of adjusting blocks 208. In various embodiments, the plurality of adjusting blocks 208 includes a first adjusting block 208a and a second adjusting block 208b. FIG. 2A is a perspective view of air ducting interface 200, FIGS. 2B-2D are cross section views of air ducting interface 200 along the X-Z plane, FIG. 2E is a cross section view of air ducting interface 200 along the Y-Z plane, FIG. 2F is a perspective top view of second air duct 204, FIG. 2G is a perspective view of second air duct 204, FIG. 2H is a cross section view of a clamping block 206, FIGS. 2I and 2J are views of first adjusting block 208a, and FIGS. 2K and 2L are views of second adjusting block 208b.

First air duct 202 includes a first coupling flange 210 that extends around an outer circumference of a first end (e.g., in the positive z-direction) of first air duct 202. First coupling flange 210 includes a sealing face 212 that is flat and portions 214a-214d of extensions. Sealing face 212 extends around an opening 216 in the first end of first air duct 202 and between opening 216 and the portions 214a-214d of the extensions. In various embodiments, sealing face 212 is configured to provide a seal between first air duct 202 and second air duct 204.

The portions 214a-214d of the extend circumferentially around sealing face 212. The portions 214a-214d of the extensions include a first portion 214a, a second portion 214b, a third portion 214c, and a fourth portion 214d. First portion 214a extends in a first direction (e.g., in the positive x-direction) from sealing face 212, second portion 214b extends in a second direction orthogonal to the first direction (e.g., in the negative y-direction) from sealing face 212, third portion 214c extends in a third direction opposite the first direction (e.g., in the negative x-direction) from sealing face 212, and fourth portion 214d extends in a fourth direction opposite the second direction (e.g., in the positive y-direction) from sealing face 212. First coupling flange 210 further includes a plurality of openings 218 formed through the extensions including portions 214a-214d. Each opening 218 of the plurality of openings 218 is configured to receive a bolt 220.

In various embodiments, first portion 214a is generally flat (e.g., parallel to the x-y plane). In various embodiments, second portion 214b is generally flat (e.g., parallel to the x-y plane). In various embodiments, third portion 214c includes a first angled face 222a that extends generally upward (e.g., in the positive z-direction) and away from a flat surface of third portion 214c (e.g., in the negative x-direction). In various embodiments, fourth portion 214d includes a second angled face 222b that extends generally upward (e.g., in the positive z-direction) and away from a flat surface of fourth portion 214d (e.g., in the positive y-direction).

Second air duct 204 includes a second coupling flange 224 that extends around an outer circumference of a first end (e.g., in the negative z-direction) of second air duct 204. Second coupling flange 224 includes a sealing surface 226 that is flat and a plurality of angled clamping surfaces 228. Sealing surface 226 faces away from second air duct 204 (e.g., in the negative z-direction) and is configured to mate with sealing face 212 of first air duct 202. When mated, sealing face 212 and sealing surface 226 provide an air seal between first air duct 202 and second air duct 204. The plurality of angled clamping surfaces 228 extend circumferentially around sealing surface 226.

The plurality of angled clamping surfaces 228 includes a first angled clamping surface 228a, a second angled clamping surface 228b, a third angled clamping surface 228c, and a fourth angled clamping surface 228d. First angled clamping surface 228a extends in the first direction (e.g., in the positive x-direction) from sealing surface 226, second angled clamping surface extends in the second direction orthogonal to the first direction (e.g., in the negative y-direction) from sealing surface 226, third angled clamping surface 228c extends in third direction opposite the first direction (e.g., in the negative x-direction) from sealing surface 226, and fourth angled clamping surface 228d extends in the fourth direction opposite the second direction (e.g., in the positive y-direction) from sealing surface 226. Each angled clamping surface 228a-228d is configured to engage one of portions 214a-214d.

Each clamping block 206 includes a bottom surface 230 (e.g., in the negative z-direction), a top surface 232 (e.g., in the positive z-direction), a front portion 234 (e.g., in the negative x-direction), and an opening 236 extending through clamping block 206. Bottom surface 230 of clamping block 206 is configured to mate with first coupling flange 210 of first air duct. In various embodiments, bottom surface 230 is configured to mate with a portion of the extensions (e.g., one of portions 214a-214d) of first coupling flange 210. In various embodiments, bottom surface 230 may be flat to provide a tight coupling between clamping block 206 and the portions 214a-214d of the extensions. Front portion 234 includes an angled bottom surface that extends away (e.g., in the negative x-direction) and upward (e.g., in the positive z-direction) from bottom surface 230. The angled bottom surface of front portion 234 provides a gap between first coupling flange 210 and clamping block 206 when clamping block 206 is coupled to first air duct 202. Opening 236 extends through clamping block 206 from top surface 232 to bottom surface 230 (e.g., along the z-axis) and is configured to receive bolt 220 to secure clamping block 206 to first air duct 202.

Each adjusting block 208 includes a bolting face 240 (e.g., in the positive z-direction), a bottom surface 242 (e.g., in the negative z-direction), a first angled portion 244 (e.g., in the negative x-direction), a second angled portion 246 (e.g., in the positive x-direction), and an opening 248 extending through adjusting block 208. Opening 248 extends through adjusting block 208 from bolting face 240 to bottom surface 242 and is configured to receive bolt 220. In various embodiments, opening 248 may be circular. In various embodiments, opening 248 may be oblong shaped, allowing adjusting block 208 to slide with respect to bolt 220. Bottom surface 242 is configured to mate with first coupling flange 210 and second coupling flange 224. First angled portion 244 is configured to engage an angled clamping surface 228a-228b of second air duct 204. Second angled portion 246 is configured to engage an angled face 222 of first air duct 202.

In various embodiments, each adjusting block 208 may have a different shape than each other adjusting block 208. In various embodiments, each adjusting block 208 may have the same shape as each other adjusting block 208. A first adjusting block 208a is illustrated in FIGS. 2I and 2J, in accordance with various embodiments. First angled portion 244 of first adjusting block 208a extends upward (e.g., in the positive z-direction) from bottom surface 242 and away (e.g., in the positive x-direction) from second angled portion 246. As illustrated, bolting face 240 is flat along an entire length (e.g., along the x-axis) first adjusting block 208. A second adjusting block 208b is illustrated in FIGS. 2K and 2L, in accordance with various embodiments. First angled portion 244 of second adjusting block 208b extends downward (e.g., in the negative z-direction) from bottom surface 242 and away (e.g., in the positive x-direction) from second angled portion 246. As illustrated, bolting face 240 is about parallel with bottom surface 242 along a length of second adjusting block 208b, including along a length of first angled portion 244.

A first clamping block 206 is coupled to first portion 214a of first air duct 202 using one or more bolts 220. Each bolt 220 passes through the first clamping block 206 and first portion 214a to secure the first clamping block 206 to first portion 214a. A second clamping block 206 is coupled to second portion 214b of first air duct 202 using one or more bolts 220. Each bolt 220 passes through the second clamping block 206 and second portion 214b to secure the second clamping block 206 to second portion 214b. As previously discussed, there is a gap between each clamping block 206, and more specifically, between front portion 234 of clamping block 206 and first coupling flange 210 of first air duct 202. Placing and securing clamping blocks 206 to first air duct 202 prior to installation of second air duct 204 allows air ducting interface 200 to be installed in locations with less space than other interfaces.

Second air duct 204, and more specifically, second coupling flange 224 is moved into place such that second coupling flange 224 slides into the gap formed between each clamping block 206 and first coupling flange 210. Specifically, first angled clamping surface 228a slides between a first clamping block 206 and first portion 214a and second angled clamping surface 228b slides between a second clamping block 206 and second portion 214b. This also places third angled clamping surface 228c over (e.g., in the positive z-direction) third portion 214c and fourth angled clamping surface 228d over fourth portion 214d. Second adjusting block 208b is then secured to first air duct 202 using one or more bolts 220 so that first angled portion 244 engages second air duct 204 and second angled portion 246 engages first coupling flange 210. More specifically, first angled portion 244 engages first angled face 222a of third portion 214c and second angled portion 246 engages third angled clamping surface 228c. First adjusting block 208a is secured to first air duct 202 using one or more bolts 220 so that first angled portion 244 engages second air duct 204 and second angled portion 246 engages first coupling flange 210. More specifically, first angled portion 244 engages second angled face 222b of fourth portion 214d and second angled portion 246 engages fourth angled clamping surface 228d.

As each bolt 220 is tightened, or in other words, a torque is applied to each bolt 220, the corresponding adjusting block 208 is pushed toward second air duct 204. This movement provides a clamping force on second air duct 204 and a tangential force that tightens the interface between second air duct and clamping blocks 206. That is, adjusting block 208 are self-adjusting blocks that provide a compound force on second air duct 204 while tending to minimize the moment applied to each bolt 220.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An air duct interface, comprising:
    a first air duct including a first opening and a first coupling flange disposed circumferentially around the first opening;
    a second air duct including a second opening and a second coupling flange circumferentially surrounding the second opening;
    a first clamping block coupled to the first coupling flange by a first bolt, wherein the second coupling flange is disposed between a portion of the first clamping block and the first coupling flange; and
    a first adjusting block coupled to the first coupling flange by a second bolt, the first adjusting block engaging the first coupling flange and the second coupling flange.

2. The air duct interface of claim 1, wherein the first coupling flange includes a sealing face disposed circumferentially around the first opening and an extension disposed circumferentially around the sealing face.

3. The air duct interface of claim 2, wherein the extension includes a first hole configured to receive the first bolt and a second hole configured to receive the second bolt.

4. The air duct interface of claim 2, wherein the extension includes a first portion extending in a first direction, a second portion extending in a second direction orthogonal to the first direction, a third portion extending in a third direction opposite the first direction, and a fourth portion extending in a fourth direction opposite the second direction,
    wherein the first clamping block is coupled to the first portion, and
    wherein the first adjusting block is coupled to the fourth portion.

5. The air duct interface of claim 4, wherein the third portion includes a first angled face and the fourth portion includes a second angled face, wherein the second angled face engages the first adjusting block.

6. The air duct interface of claim 1, wherein the second coupling flange includes a sealing surface and a plurality of angled clamping surfaces.

7. The air duct interface of claim 6, wherein the plurality of angled clamping surfaces includes a first clamping surface extending in a first direction, a second clamping surface extending in a second direction orthogonal to the first direction, a third clamping surface extending in a third direction opposite the first direction, and a fourth clamping surface extending in a fourth direction opposite the second direction.

8. The air duct interface of claim 1, wherein the first clamping block includes a top surface, a bottom surface, and an angled surface, wherein the bottom surface engages the first coupling flange and the angled surface engages the second coupling flange.

9. The air duct interface of claim 1, wherein the first adjusting block includes a top surface, a bottom surface, a first angled portion, a second angled portion opposite the first angled portion, and an opening configured to receive the second bolt, wherein the bottom surface engages the first coupling flange, the first angled portion engages the first coupling flange, and the second angled portion engages the second coupling flange.

10. The air duct interface of claim 9, wherein the opening is oblong.

11. A system for connecting an air duct to an aircraft engine, the system comprising:
    a mating interface including:
        a first air duct including a first opening and a first coupling flange disposed circumferentially around the first opening; and
        a second air duct including a second opening and a second coupling flange circumferentially surrounding the second opening;
    a first clamping block coupled to the first coupling flange by a first bolt, wherein the second coupling flange is disposed between a portion of the first clamping block and the first coupling flange; and
    a first adjusting block coupled to the first coupling flange by a second bolt, the first adjusting block engaging the first coupling flange and the second coupling flange.

12. The system of claim 11, wherein the first coupling flange includes a sealing face disposed circumferentially around the first opening and an extension disposed circumferentially around the sealing face.

13. The system of claim 12, wherein the extension includes a first hole configured to receive the first bolt and a second hole configured to receive the second bolt.

14. The system of claim 12, wherein the extension includes a first portion extending in a first direction, a second portion extending in a second direction orthogonal to the first direction, a third portion extending in a third direction opposite the first direction, and a fourth portion extending in a fourth direction opposite the second direction,
    wherein the first clamping block is coupled to the first portion, and
    wherein the first adjusting block is coupled to the fourth portion.

15. The system of claim 14, wherein the third portion includes a first angled face and the fourth portion includes a second angled face, wherein the second angled face engages the first adjusting block.

16. The system of claim 11, wherein the second coupling flange includes a sealing surface and a plurality of angled clamping surfaces.

17. The system of claim 16, wherein the plurality of angled clamping surfaces includes a first clamping surface extending in a first direction, a second clamping surface extending in a second direction orthogonal to the first direction, a third clamping surface extending in a third direction opposite the first direction, and a fourth clamping surface extending in a fourth direction opposite the second direction.

18. The system of claim 11, wherein the first clamping block includes a top surface, a bottom surface, and an angled surface, wherein the bottom surface engages the first coupling flange and the angled surface engages the second coupling flange.

19. The system of claim 11, wherein the first adjusting block includes a top surface, a bottom surface, a first angled portion, a second angled portion opposite the first angled portion, and an opening configured to receive the second bolt, wherein the bottom surface engages the first coupling flange, the first angled portion engages the first coupling flange, and the second angled portion engages the second coupling flange.

20. The system of claim 19, wherein the opening is oblong.

* * * * *